(12) United States Patent
Reagan et al.

(10) Patent No.: US 8,224,145 B2
(45) Date of Patent: Jul. 17, 2012

(54) INSTALLING SPLITTER MODULE, STORAGE RECEPTACLES AND PIGTAILS WHILE PIGTAIL CONNECTORS LEFT IN THE STORAGE RECEPTACLES

(75) Inventors: Randy Reagan, Morristown, NJ (US); Jeff Gniadek, Northbridge, MA (US); Tom Parsons, Leominster, MA (US); Michael Noonan, Shrewsbury, MA (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 13/179,129

(22) Filed: Jul. 8, 2011

(65) Prior Publication Data

US 2011/0262100 A1    Oct. 27, 2011

Related U.S. Application Data

(60) Continuation of application No. 12/685,478, filed on Jan. 11, 2010, now Pat. No. 8,005,335, which is a continuation of application No. 11/699,716, filed on Jan. 29, 2007, now Pat. No. 7,646,958, which is a continuation of application No. 11/225,099, filed on Sep. 14, 2005, now Pat. No. 7,171,102, which is a division of application No. 11/155,818, filed on Jun. 20, 2005, now Pat. No. 7,088,899, which is a continuation of application No. 10/714,814, filed on Nov. 17, 2003, now Pat. No. 6,983,095.

(51) Int. Cl.
*G02B 6/00* (2006.01)

(52) U.S. Cl. ............................................ 385/135

(58) Field of Classification Search .................. 385/135
See application file for complete search history.

(56) References Cited

U.S. PATENT DOCUMENTS

| 4,736,100 | A | 4/1988 | Vastagh |
| 4,747,020 | A | 5/1988 | Brickley et al. |
| 4,792,203 | A | 12/1988 | Nelson et al. |
| 4,824,196 | A | 4/1989 | Bylander |
| 4,861,134 | A | 8/1989 | Alameel et al. |
| 4,900,123 | A | 2/1990 | Barlow et al. |
| 4,948,220 | A | 8/1990 | Violo et al. |

(Continued)

FOREIGN PATENT DOCUMENTS

CN    2426610 Y    4/2001

(Continued)

OTHER PUBLICATIONS 24 photos of LambdaUnite® Blank Card; "LambdaUnite® MultiService Switch (MSS)" brochure (2003); and "Lucent's LambdaUnite® Busts Out" official release (Jan. 29, 2002).

(Continued)

*Primary Examiner* — Chandrika Prasad
(74) *Attorney, Agent, or Firm* — Merchant & Gould P.C.

(57) ABSTRACT

A method for configuring an enclosure used in a communications network is described. The method may include providing a group of pigtails. The method may further include routing the group of pigtails circumferentially around a subscriber termination field, where the group of pigtails is associated with an optical splitter module used to convey optical signals to a destination, and where the routing is performed in a manner that does not substantially obstruct access to at least one of a group of subscriber terminations that are associated with the subscriber termination field.

5 Claims, 15 Drawing Sheets

U.S. PATENT DOCUMENTS

| | | |
|---|---|---|
| 4,995,688 A | 2/1991 | Anton et al. |
| 5,023,646 A | 6/1991 | Ishida et al. |
| 5,058,983 A | 10/1991 | Corke et al. |
| 5,073,042 A | 12/1991 | Mulholland et al. |
| 5,076,688 A | 12/1991 | Bowen et al. |
| 5,142,598 A | 8/1992 | Tabone |
| 5,214,735 A | 5/1993 | Henneberger et al. |
| 5,233,674 A | 8/1993 | Vladic |
| 5,274,729 A | 12/1993 | King et al. |
| 5,274,731 A | 12/1993 | White |
| 5,317,663 A | 5/1994 | Beard et al. |
| 5,333,221 A | 7/1994 | Briggs et al. |
| 5,333,222 A | 7/1994 | Belenkiy et al. |
| 5,359,688 A | 10/1994 | Underwood |
| 5,367,598 A | 11/1994 | Devenish, III et al. |
| 5,402,515 A | 3/1995 | Vidacovich et al. |
| 5,408,557 A | 4/1995 | Hsu |
| RE34,955 E | 5/1995 | Anton et al. |
| 5,420,958 A | 5/1995 | Henson et al. |
| 5,442,726 A | 8/1995 | Howard et al. |
| 5,448,015 A | 9/1995 | Jamet et al. |
| 5,469,526 A | 11/1995 | Rawlings |
| 5,497,444 A | 3/1996 | Wheeler |
| 5,511,144 A | 4/1996 | Hawkins et al. |
| 5,542,015 A | 7/1996 | Hultermans |
| 5,636,138 A | 6/1997 | Gilbert et al. |
| 5,647,043 A | 7/1997 | Anderson et al. |
| 5,708,751 A | 1/1998 | Mattei |
| 5,734,776 A | 3/1998 | Puetz |
| 5,764,844 A | 6/1998 | Mendes |
| 5,774,612 A | 6/1998 | Belenkiy et al. |
| 5,784,515 A | 7/1998 | Tamaru et al. |
| 5,823,646 A | 10/1998 | Arizpe et al. |
| 5,825,955 A | 10/1998 | Ernst et al. |
| 5,883,995 A | 3/1999 | Lu |
| 5,909,526 A | 6/1999 | Roth et al. |
| 5,930,425 A | 7/1999 | Abel et al. |
| 5,945,633 A | 8/1999 | Ott et al. |
| 5,956,444 A | 9/1999 | Duda et al. |
| 5,969,294 A | 10/1999 | Eberle et al. |
| 6,027,252 A | 2/2000 | Erdman et al. |
| 6,041,155 A | 3/2000 | Anderson et al. |
| 6,044,193 A | 3/2000 | Szentesi et al. |
| 6,061,492 A | 5/2000 | Strause et al. |
| 6,076,975 A | 6/2000 | Roth |
| 6,079,881 A | 6/2000 | Roth |
| 6,149,315 A | 11/2000 | Stephenson |
| 6,160,946 A | 12/2000 | Thompson et al. |
| 6,188,687 B1 | 2/2001 | Mussman et al. |
| 6,188,825 B1 | 2/2001 | Bandy et al. |
| 6,208,796 B1 | 3/2001 | Williams Vigliaturo |
| 6,227,717 B1 | 5/2001 | Ott et al. |
| 6,234,683 B1 | 5/2001 | Waldron et al. |
| 6,236,795 B1 | 5/2001 | Rodgers |
| 6,240,229 B1 | 5/2001 | Roth |
| 6,256,443 B1 | 7/2001 | Uruno |
| 6,271,484 B1 | 8/2001 | Tokutsu |
| 6,278,829 B1 | 8/2001 | BuAbbud et al. |
| RE37,489 E | 1/2002 | Anton et al. |
| 6,347,888 B1 | 2/2002 | Puetz |
| 6,356,697 B1 | 3/2002 | Braga et al. |
| 6,363,200 B1 | 3/2002 | Thompson et al. |
| 6,385,381 B1 | 5/2002 | Janus et al. |
| 6,411,767 B1 | 6/2002 | Burrous et al. |
| 6,424,781 B1 | 7/2002 | Puetz et al. |
| 6,425,694 B1 | 7/2002 | Szilagyi et al. |
| 6,431,762 B1 | 8/2002 | Taira et al. |
| 6,434,313 B1 | 8/2002 | Clapp, Jr. et al. |
| 6,452,925 B1 | 9/2002 | Sistanizadeh et al. |
| 6,453,033 B1 | 9/2002 | Little et al. |
| 6,464,402 B1 | 10/2002 | Andrews et al. |
| D466,087 S | 11/2002 | Cuny et al. |
| 6,480,487 B1 | 11/2002 | Wegleitner et al. |
| 6,483,977 B2 | 11/2002 | Battey et al. |
| 6,496,640 B1 | 12/2002 | Harvey et al. |
| 6,535,682 B1 | 3/2003 | Puetz et al. |
| 6,539,147 B1 | 3/2003 | Mahony |
| 6,539,160 B2 | 3/2003 | Battey et al. |
| 6,542,688 B1 | 4/2003 | Battey et al. |
| 6,554,485 B1 | 4/2003 | Beatty et al. |
| 6,577,595 B1 | 6/2003 | Counterman |
| 6,597,670 B1 | 7/2003 | Tweedy et al. |
| 6,614,980 B1 | 9/2003 | Mahony |
| 6,621,975 B2 | 9/2003 | Laporte et al. |
| 6,623,170 B2 | 9/2003 | Petrillo |
| 6,625,375 B1 | 9/2003 | Mahony |
| 6,631,237 B2 | 10/2003 | Knudsen et al. |
| 6,654,536 B2 | 11/2003 | Battey et al. |
| 6,661,961 B1 | 12/2003 | Allen et al. |
| 6,668,127 B1 | 12/2003 | Mahony |
| 6,755,574 B2 | 6/2004 | Fujiwara et al. |
| 6,760,530 B1 | 7/2004 | Mandry |
| 6,760,531 B1 | 7/2004 | Solheid et al. |
| 6,778,752 B2 | 8/2004 | Laporte et al. |
| 6,788,786 B1 | 9/2004 | Kessler et al. |
| 6,792,190 B2 | 9/2004 | Xin et al. |
| 6,792,191 B1 | 9/2004 | Clapp, Jr. et al. |
| 6,815,612 B2 | 11/2004 | Bloodworth et al. |
| 6,845,207 B2 | 1/2005 | Schray |
| 6,850,685 B2 | 2/2005 | Tinucci et al. |
| 6,853,795 B2 | 2/2005 | Dagley et al. |
| 6,870,734 B2 | 3/2005 | Mertesdorf et al. |
| 6,901,200 B2 | 5/2005 | Schray |
| 6,920,274 B2 | 7/2005 | Rapp et al. |
| 6,925,241 B2 | 8/2005 | Bohle et al. |
| 6,950,593 B2 | 9/2005 | Hodge et al. |
| 6,980,725 B1 | 12/2005 | Swieconek |
| 6,983,095 B2 | 1/2006 | Reagan et al. |
| 7,029,322 B2 | 4/2006 | Ernst et al. |
| 7,086,539 B2 | 8/2006 | Knudsen et al. |
| 7,088,899 B2 | 8/2006 | Reagan et al. |
| 7,103,255 B2 | 9/2006 | Reagan et al. |
| 7,142,764 B2 | 11/2006 | Allen et al. |
| 7,146,089 B2 | 12/2006 | Reagan et al. |
| 7,171,102 B2 | 1/2007 | Reagan et al. |
| 7,187,838 B2 | 3/2007 | Feustel et al. |
| 7,198,409 B2 | 4/2007 | Smith et al. |
| 7,200,317 B2 | 4/2007 | Reagan et al. |
| 7,218,827 B2 | 5/2007 | Vongseng et al. |
| 7,233,731 B2 | 6/2007 | Solheid et al. |
| 7,277,620 B2 | 10/2007 | Vongseng et al. |
| 7,369,741 B2 | 5/2008 | Reagan et al. |
| 7,407,330 B2 | 8/2008 | Smith et al. |
| 7,457,503 B2 | 11/2008 | Solheid et al. |
| 7,471,869 B2 | 12/2008 | Reagan et al. |
| 7,496,268 B2 | 2/2009 | Escoto et al. |
| 7,623,749 B2 | 11/2009 | Reagan et al. |
| 7,646,958 B1 | 1/2010 | Reagan et al. |
| 2002/0034290 A1 | 3/2002 | Pershan |
| 2002/0150372 A1 | 10/2002 | Schray |
| 2002/0181893 A1 | 12/2002 | White et al. |
| 2003/0002812 A1 | 1/2003 | Lampert |
| 2003/0165315 A1 | 9/2003 | Trebesch et al. |
| 2003/0174996 A1 | 9/2003 | Henschel et al. |
| 2004/0074852 A1 | 4/2004 | Knudsen et al. |
| 2004/0126069 A1 | 7/2004 | Jong et al. |
| 2004/0165852 A1 | 8/2004 | Erwin et al. |
| 2004/0228598 A1* | 11/2004 | Allen et al. .................. 385/135 |
| 2004/0264873 A1 | 12/2004 | Smith et al. |
| 2005/0002633 A1 | 1/2005 | Solheid et al. |
| 2005/0129379 A1 | 6/2005 | Reagan et al. |
| 2006/0008231 A1 | 1/2006 | Reagan et al. |
| 2008/0008436 A1 | 1/2008 | Reagan et al. |
| 2008/0008437 A1 | 1/2008 | Reagan et al. |
| 2008/0019655 A1 | 1/2008 | Vongseng et al. |
| 2008/0025684 A1 | 1/2008 | Vongseng et al. |
| 2008/0317425 A1 | 12/2008 | Smith et al. |
| 2009/0074372 A1 | 3/2009 | Solheid et al. |
| 2009/0087157 A1 | 4/2009 | Smith et al. |
| 2009/0190896 A1 | 7/2009 | Smith et al. |
| 2009/0196565 A1 | 8/2009 | Vongseng et al. |
| 2009/0285540 A1 | 11/2009 | Reagan et al. |
| 2009/0290843 A1 | 11/2009 | Reagan et al. |
| 2009/0297111 A1 | 12/2009 | Reagan et al. |
| 2010/0124392 A1 | 5/2010 | Reagan et al. |

FOREIGN PATENT DOCUMENTS

| | | |
|---|---|---|
| EP | 0 743 701 A2 | 11/1996 |
| EP | 0 788 002 | 8/1997 |
| EP | 0 871 047 | 10/1998 |
| EP | 0 975 180 | 1/2000 |
| EP | 1 045 267 | 10/2000 |
| JP | 63-229409 | 9/1988 |
| JP | 1144266 S | 6/2002 |
| JP | 3307618 B2 | 7/2002 |
| JP | 3761762 B2 | 3/2006 |
| WO | WO 95/20175 | 7/1995 |
| WO | WO 98/53347 | 11/1998 |
| WO | WO 99/27404 | 6/1999 |
| WO | WO 00/52504 | 9/2000 |
| WO | WO 00/75706 | 12/2000 |
| WO | WO 02/21182 A1 | 3/2002 |
| WO | WO 02/103429 | 12/2002 |

OTHER PUBLICATIONS

ADC Telecommunications, Inc., brochure titled *OMX™ 600: Optical Distribution Frame*, © 2001 (17 pages).

ADC Telecommunications, Inc., brochure titled *Value-Added module System*, © 2000 (29 pages).

ADC Telecommunications, Inc., brochure titled *Value-Added module System: Optical Distribution Frame (OMX™ 600)*, © 2001 (11 pages).

ADC Telecommunications, Inc.'s OMX™ 600, Optical Distribution Frame Brochure; front cover, Table of Contents, pp. 1-14, and back cover; revised Feb. 2000, Item No. 854.

Complaint relating to Civil Action No. 08-CV-5222-RMK-JJK, filed Sep. 19, 2008.

First Amended Complaint relating to *ADC Telecommunications, Inc. v. Tyco Electronics Corp.*, Civil Action No. 08-CV-05222, filed Dec. 8, 2008.

Answer, Affirmative Defenses, and Counter Claims to the First Amended Complaint relating to *ADC Telecommunications, Inc. v. Tyco Electronics Corp.*, Civil Action No. 08-CV-05222, filed Mar. 13, 2009.

ADC's Reply to Counterclaims and Counterclaims relating to *ADC Telecommunications, Inc. v. Tyco Electronics Corp.*, Civil Action No. 08-CV-05222, filed Apr. 2, 2009.

Stipulated Dismissal of all Claims and Counterclaims relating to *ADC Telecommunications, Inc. v. Tyco Electronics Corp.*, Civil Action No. 08-CV-05222, filed Oct. 30, 2009.

Complaint relating to Civil Action No. 08-CV-02234-DWF-JSM, filed Jun. 13, 2008.

First Amended Complaint, *ADC Telecommunication, Inc. and Fiber Optic Network Solutions Corp. v. AFL Telecommunications LLC*, Civil Action No. 0:08-cv-02234-DWF-JSM, 8 pages (Aug. 14, 2008).

Defendant's Answer and Defenses in Response to the First Amended Complaint, *ADC Telecommunication, Inc. and Fiber Optic Network Solutions Corp. v. AFL Telecommunications LLC*, Civil Action No. 0:08-cv-02234-DWF-JSM, 14 pages (Dec. 8, 2008).

Amended Order for Pretrial Conference, *ADC Telecommunication, Inc. and Fiber Optic Network Solutions Corp. v. AFL Telecommunications LLC*, Civil Action No. 0:08-cv-02234-DWF-JSM, 5 pages (Dec. 11, 2008).

*Prior art statement* submitted by AFL Telecommunications LLC in Civil Action No. 08-CV-02234-DWF-JSM on May 11, 2009 (145 pages).

*Supplemental prior art statement* submitted by AFL Telecommunications LLC in Civil Action No. 08-CV-02234-DWF-JSM on May 19, 2009 (155 pages).

Response to prior art statement submitted by ADC Telecommunications, Inc. in Civil Action No. 08-CV-02234-DWF-JSM on Aug. 18, 2009 (131 pages).

*Second supplemental prior art statement* filed Nov. 10, 2009 by AFL Telecommunications LLC in Civil Action No. 08-CV-02234-DWF-JSM, which was filed Jun. 13, 2008.

Joint Claim Construction Statement, relating to *ADC Telecommunications, Inc. v, AFL Telecommunications LLC*, Civil Action No. 08-CV-02234 Filed Nov. 17, 2009 (40 pages).

Plaintiff ADC's Markman Brief (Redacted Version), filed Feb. 9, 2010, relating to *ADC Telecommunications, Inc. v, AFL Telecommunications LLC*, Civil Action No. 08-CV-02234-DWF-JSM (99 pages).

Defendant AFL Telecommunications LLC's Memorandum in Support of Proposed Claim Construction, (AFL's Markman Brief), filed Feb. 9, 2010, relating to *ADC Telecommunications, Inc. v, AFL Telecommunications LLC*, Civil Action No. 08-CV-02234 (42 pages).

Plaintiff ADC's Responsive Markman Brief, filed Mar. 9, 2010, relating to *ADC Telecommunications, Inc. v, AFL Telecommunications LLC*, Civil Action No. 08-CV-02234 (21 pages).

Defendant AFL Telecommunications LLC's Answering Claim Construction Brief, filed Mar. 9, 2010, relating to *ADC Telecommunications, Inc. v, AFL Telecommunications LLC*, Civil Action No. 08-CV-02234 (60).

European Search Report dated Apr. 2, 2008.

Nexans, Cross-Connect Cabinet III: Plastic Watertight Cabinet for FTTH Applications, dated 2002 (2 pages).

Nexans, Cross-Connect Cabinet V: Metallic Watertight Cabinet for FTTH Applications, dated 2002 (2 pages).

21 photographs showing what AFL Telecommunications LLC purports to be the ECOE cabinet referenced in the Prior art statement and the Supplemental prior art statement listed above. AFL Telecommunications LLC asserts the cabinet was on sale as early as 2001.

AT&T Network Systems catalog entitled "Fiber Optic Products Innovation for wide ranging applications," front and back covers and pp. 6-1 through 6-16 (18 pages) (© 1995).

NTT Int'l Fiber Termination Module (FTM) & Premises Optical Distribution Cabinets (PODC) product brochure, 3 pages (Applicants admit as prior art as of Nov. 17, 2003).

HRS catalog entitled "Optical Fibre Connectors," front and back covers and pp. 16, 17 and 49 (5 pages) (Mar. 1991).

Brochure from Amphenol Corp. entitled "Amphenol® 954 Series one piece SC Connector," 2 pgs. (1990).

AMP Inc. catalog entitled "Fiber Optic Products," front and back covers and p. 59, (4 pgs.) (© 1991).

Hasegawa et al., *100GHz-48CH Athermal AWG with a Novel Temperature Insensitive Principle*, National Fiber Optics Engineers Conference, 2003 Technical Proceedings, pp. 801-808.

*Couplers: Couplers WDMS Packaging*, Alcoa Fujikura Ltd., Telecommunications Division, © 2000 (5 pages) showing AFL splitters.

ATI Optique Catalog, ATI Optique Division of TI electronique, Version 2.6, released Mar. 27, 2002 (50 pages).

Optical fiber coupler review, Technical Report 2001, showing Sumitomo Osaka Cement Co. Ltd's Optical Coupler (pp. 41-42).

Iwano, S. et al., "MU-type Optical Fiber Connector System," *NTT Review*, vol. 9, No. 2, pp. 63-71 (Mar. 1997).

Sugita, E. et al., "SC-Type Single-Mode Optical Fiber Connectors," *Journal of Lightwave Technology*, vol. 7, No. 11, pp. 1689-1696 (Nov. 1989).

ADC Telecommunications, Inc.'s Outside Plant, Fiber Cross-Connect Solutions Products Brochure; front cover, Table of Contents, pp. 1-48, and back cover.; revised Jun. 2002, Item No. 1047.

ADC Telecommunications, Inc.'s 6th Edition of Next Generation Frame (NGF) Product Family Ordering Guide; front cover, Table of Contents, pp. 1-41, and back cover; revised Feb. 2003, Item No. 820.

ADC Telecommunications, Inc.'s Fiber Optic, Cable Assemblies and Accessories Brochure; front cover, Table of Contents, pp. 1-23, and back cover; revised Apr. 2003, Item No. 100300.

FONS Corporation's MDC Series Rack or Wall Mount Enclosures product sheet, 3 pages, (2002).

FONS Corporation's Technical Drawing No. 11669, Rev. D, of Distribution Cabinet Assembly MFDC-7, 1 page (technical drawing depicting the device shown in "Model MDC-7, product sheet" above).

ADC Telecommunications, Inc.'s Secure Fiber Entrance Terminal (SFET) Brochure; front cover, pp. 2-7, and back cover; revised May 1998, Item No. 1005.

ADC Telecommunications, Inc.'s 2nd Edition of Fiber Panel Products; front cover, Table of Contents, pp. 1-111, and back cover; revised Jul. 1996, Item No. 846.

Assembly reference drawings having drawing No. 1067101, dated Aug. 17, 1999 (8 pages).

Fiber distribution drawings having drawing No. 1069967, dated Aug. 17, 1999 (2 pages).

Installation drawings having drawing No. 1069965, dated Aug. 14, 1999 (3 pages).

Connectorized splitter drawings having drawing No. 1067961, dated Aug. 18, 1999 (2 pages).

Portions of the prosecution history of copending and commonly assigned patent application having U.S. Publication No. 2007/0165995 including Restriction Requirement mailed Nov. 1, 2007, Response to Restriction Requirement submitted Dec. 3, 2007, Non-final Office Action mailed Jan. 2, 2008, Response to Non-final Office Action submitted May 2, 2008, Notice of Allowance mailed Jun. 26, 2008, Amendment After Allowance and Issue fee payment submitted Sep. 25, 2008, Response to Amendment After Allowance mailed Oct. 10, 2008, an Issue Notification mailed Oct. 29, 2008, Petition to Withdraw from Issue, RCE, and Amendment mailed Nov. 14, 2008, Patent Withdrawal Notice mailed Nov. 17, 2008, Non-final Office Action mailed Dec. 11, 2008, and Response to Non-final Office Action submitted Mar. 27, 2009 (88 pages total).

Stipulated Dismissal of All Claims and Counterclaims, *ADC Telecommunication, Inc. and Fiber Optic Network Solutions Corp. v. AFL Telecommunications LLC*, Civil Action No. 0:08-cv-02234-DWF-JSM, 2 pages (Jul. 27, 2010).

Order for Dismissal with Prejudice, *ADC Telecommunication, Inc. and Fiber Optic Network Solutions Corp. v. AFL Telecommunications LLC*, Civil Action No. 0:08-cv-02234-DWF-JSM, 1 page (Jul. 28, 2010).

Order for Dismissal with Prejudice, *ADC Telecommunication, Inc. and Fiber Optic Network Solutions Corp. v. AFL Telecommunications LLC*, Civil Action No. 0:08-cv-02234-DWF-JSM, 1 page (Aug. 6, 2010).

\* cited by examiner

Fiber Distribution Hub

Side-by-Side Equipment Layout

INSTALLING SPLITTER MODULE, STORAGE RECEPTACLES AND PIGTAILS WHILE PIGTAIL CONNECTORS LEFT IN THE STORAGE RECEPTACLES

CROSS REFERENCE TO RELATED APPLICATIONS

This application is a continuation of U.S. patent application Ser. No. 12/685,478, filed on Jan. 11, 2010, now issued U.S. Pat. No. 8,005,335, which is a continuation of U.S. patent application Ser. No. 11/699,716, filed on Jan. 29, 2007, now U.S. Pat. No. 7,646,958, which is a continuation of U.S. patent application Ser. No. 11/225,099, filed on Sep. 14, 2005, now U.S. Pat. No. 7,171,102, which is a divisional of U.S. patent application Ser. No. 11/155,818, filed on Jun. 20, 2005, now U.S. Pat. No. 7,088,899, which is a continuation of U.S. patent application Ser. No. 10/714,814, filed on Nov. 17, 2003, now U.S. Pat. No. 6,983,095, which applications are hereby incorporated by reference in their entireties.

BACKGROUND OF THE INVENTION

In Fiber-to-the Premises broadband network applications optical splitters are used to split the optical signals at various points in the network. Recent network specifications call for optical splitters to be incorporated in Fiber Distribution Hubs which are re-enterable outdoor enclosures. These enclosures allow easy re-entry for access to optical splitters allowing splitter ports to be utilized effectively and for additional splitter ports to be added on an incremental basis.

In typical applications to date, optical splitters are provided prepackaged in optical splitter module housings and are provided with splitter outputs in pigtails that extend from the module. The splitter output pigtails are typically connectorized with high performance low loss SC or LC connectors. This optical splitter cassette provides protective packaging for the optical splitter components in the housing and thus provides for easy handling for otherwise fragile splitter components. This approach allows the optical splitter modules to be added incrementally to the Fiber Distribution Hub, for example, as required.

A problem arises due to the lack of protection and organization of the connectorized ends of the splitter output pigtails. These pigtails can sometimes be left dangling in a cable trough or raceway within the enclosure. This method of leaving an exposed optical component such as a high performance connector exposed in an open area leaves it susceptible to damage. The high performance connectors, if damaged, can cause delays in service connection while connectors are repaired. Leaving connectorized splitter output pigtails dangling in a cabling trough also exposes them to dirt and debris in the cabling trough. In current network deployments, it is desirable to maintain clean optical connectors to maximize the performance of the network.

In addition, the fiber pigtails in the current art are not organized in a manner conducive to rapid service delivery. In many cases, the splitters may have sixteen or thirty-two output pigtails bundled together making it difficult to find a particular pigtail. Also the bundle of loose hanging pigtails can easily become entangled causing further delays in service delivery. The tangles can actually cause congestion and in some cases result in bend induced loss on the pigtails resulting in overall lower system performance.

To solve some of these issues, a separate storage tray or enclosure has been utilized to take up slack and/or store and protect splitter output pigtail connectorized ends. However, these auxiliary devices tend to take up additional space and often hide the pigtail in an enclosure that can cause further delays in deployment depending on how much time is required to access on the tray or enclosure. Thus, there still remains a need for a solution that does not take up additional space and that provides direct access and identification to splitter output pigtail ends.

In addition, some network applications may require equipping splitter outputs with fiber optic terminators in order to eliminate reflections caused by unterminated splitter outputs. Other methods of storing connectorized pigtails in cable troughs or auxiliary trays may make it difficult to equip splitter output ports with fiber optic terminators.

Finally, current methods tend to result in a disassociation of the splitter module from the splitter output pigtail end. This usually results because the pigtail, once deployed, gets lost in the midst of other pigtails in the fiber jumper trough. When subscribers are taken out of service, it is desirable to disconnect the splitter output and redeploy or store it for ready redeployment. It is further desirable for administrative purposes to maintain association of splitter module to splitter output pigtails so that resources are used effectively over time.

SUMMARY OF THE INVENTION

In accordance with an implementation, a method for configuring an enclosure used in a communications network is provided. The method may include providing a group of pigtails. The method may include routing the group of pigtails circumferentially around a subscriber termination field, where the group of pigtails is associated with an optical splitter module used to convey optical signals to a destination, and where the routing is performed in a manner that does not substantially obstruct access to at least one of a group of subscriber terminations that are associated with the subscriber termination field.

In accordance with another implementation, an optical splitter module for use in an optical communications network is provided. The optical splitter module may include an optical splitter configured to split an incoming optical signal into a group of outgoing optical signals. The splitter module may include a faceplate configured to make the group of outgoing optical signals available to a group of pigtails, where each of the group of pigtails is configured to couple a respective one of the group of optical signals to one of a group of subscriber terminations associated with a subscriber termination field. The faceplate may be configured to facilitate incremental deployment of the optical splitter module on a shelf in a manner that facilitates making optical signals from the group of optical splitter modules available to the subscriber termination field.

In accordance with yet another implementation, an enclosure for distributing optical communication signals is provided. The enclosure may include a subscriber termination field mounting area configured to support a subscriber termination field including a group of subscriber terminations, where each of the group of subscriber terminations is associated with a subscriber. The enclosure may include an optical splitter shelf configured to support a group of optical splitter modules, where each of the group of optical splitter modules has a group of pigtails that includes a transition member, and where the group of pigtails is adapted to convey optical communication signals to at least some of the group of subscriber terminations. The enclosure may include a transition member mounting area configured to support a group of transition members to facilitate circumferential routing of the group of pigtails around the subscriber termination field.

In accordance yet another implementation, a method for connecting a subscriber to an optical communications network is provided. The method may include removing a pigtail connector from a parked location associated with a receptacle. The method may include coupling the pigtail connector to a subscriber termination associated with a subscriber, where the subscriber termination is one of a group of subscriber terminations associated with a subscriber termination field. The method may include storing slack associated with the pigtail in a vertical channel within an enclosure to facilitate routing the pigtail in a manner that does not substantially interfere with others of the group of subscriber terminations.

The foregoing and other features and advantages of the systems and methods for fiber distribution and management will be apparent from the following more particular description of preferred embodiments of the system and method as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

The preferred embodiments of the present invention are directed to an optical splitter module that is equipped with adapters for storing connectorized optical splitter pigtail ends. Adapters are administratively located on the optical splitter module bulkhead, for example, but not limited to, in octal count arrangements ideally suited to identify splitter ports having sixteen or thirty-two output ports. The adapters in accordance with preferred embodiments are used to store or stage the connectorized ends of the optical splitter for rapid location, identification, easy access and removal of pigtail output ends. In accordance with preferred embodiments, the optical splitter outputs extending from the bulkhead on the module are wrapped back and secured to adapters on the splitter bulkhead. The preferred embodiments also include methods for installing optical splitter modules and associated fixed length output pigtails, storing the connectorized ends of the pigtails in a position ready for deployment and then individually connecting the splitter outputs as required to connect service to subscriber terminations.

Figure 1:
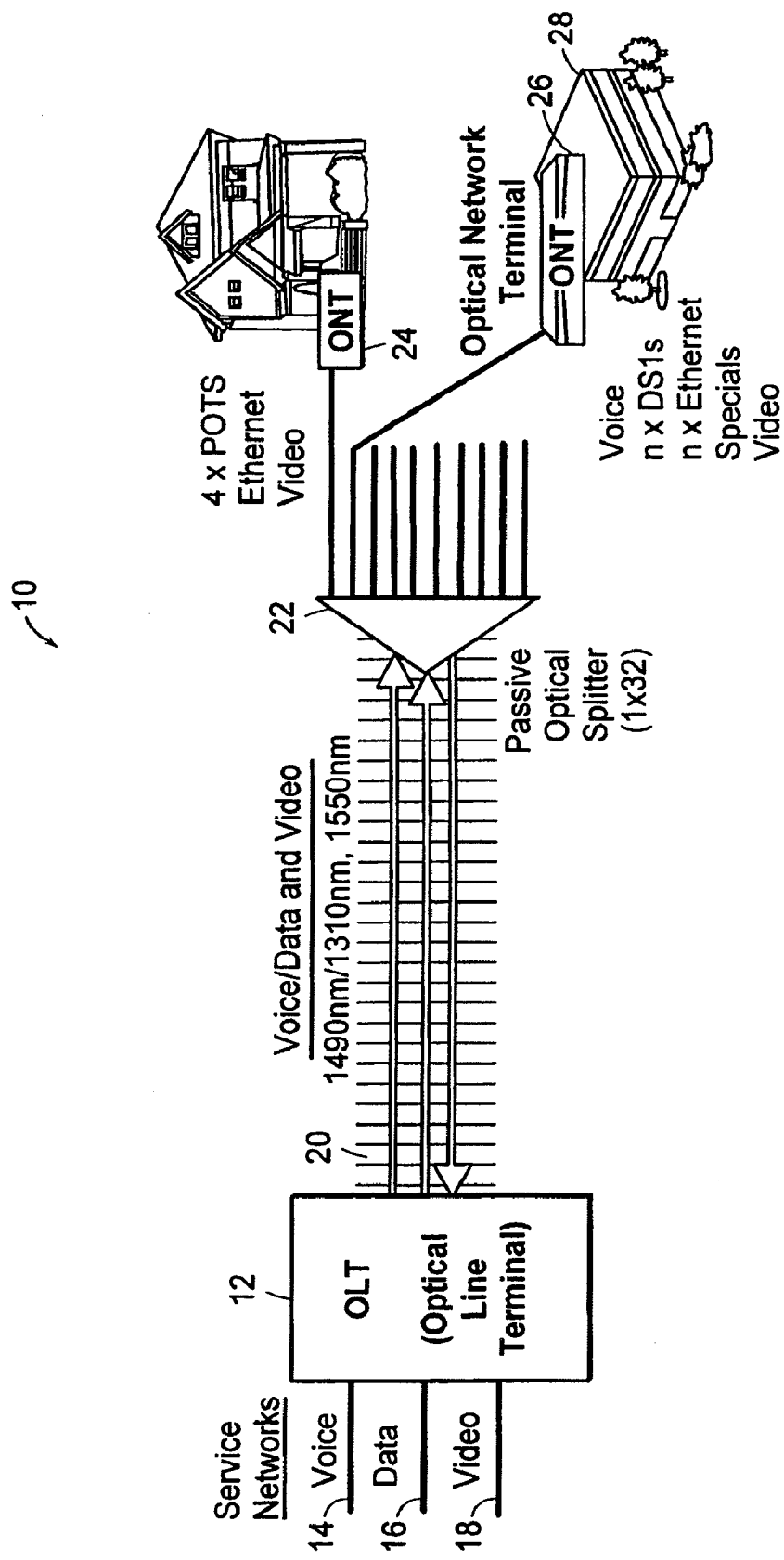
FIG. 1 illustrates schematically a broadband access network, for example, a fiber-to-the-premises (FTTP) network using passive optical network (PON) components in accordance with a preferred embodiment of the present invention.

FIG. 1 illustrates schematically a broadband access network 10, for example, a Fiber-to-the-Premises (FTTP) network using passive optical network (PON) components in accordance with a preferred embodiment of the present invention. The architecture can be a point to multi-point PON construction, which utilizes 1:32 splitters at a fiber hub enclosure within the distribution area. The architecture can be fiber rich 1:1 distribution between the fiber hub and a customer's premise. The broadband services capability of the network to distribute source information include, for example, data signals (622 Mbps×0.155 Mbps (shared)), and video signals (860 MHz, ~600 analog and digital channels, high definition television (HDTV), and video on demand (VOD)). Signaling is accomplished using wavelength division multiplexing (WDM) and fiber sharing. The network includes the optical network terminals 26 that are scalable, provide high bandwidth, multi-service applications that serve residences and small/medium businesses. The network 10 includes passive components that are located outside the plant and require minimal maintenance.

The broadband access network 10 includes digital subscriber plug-in line cards that have a broadband terminal adapter configured for receiving a digitally multiplexed broadband data stream and outputting a group of demultiplexed broadband data streams for the respective subscriber loops.

Figure 2:
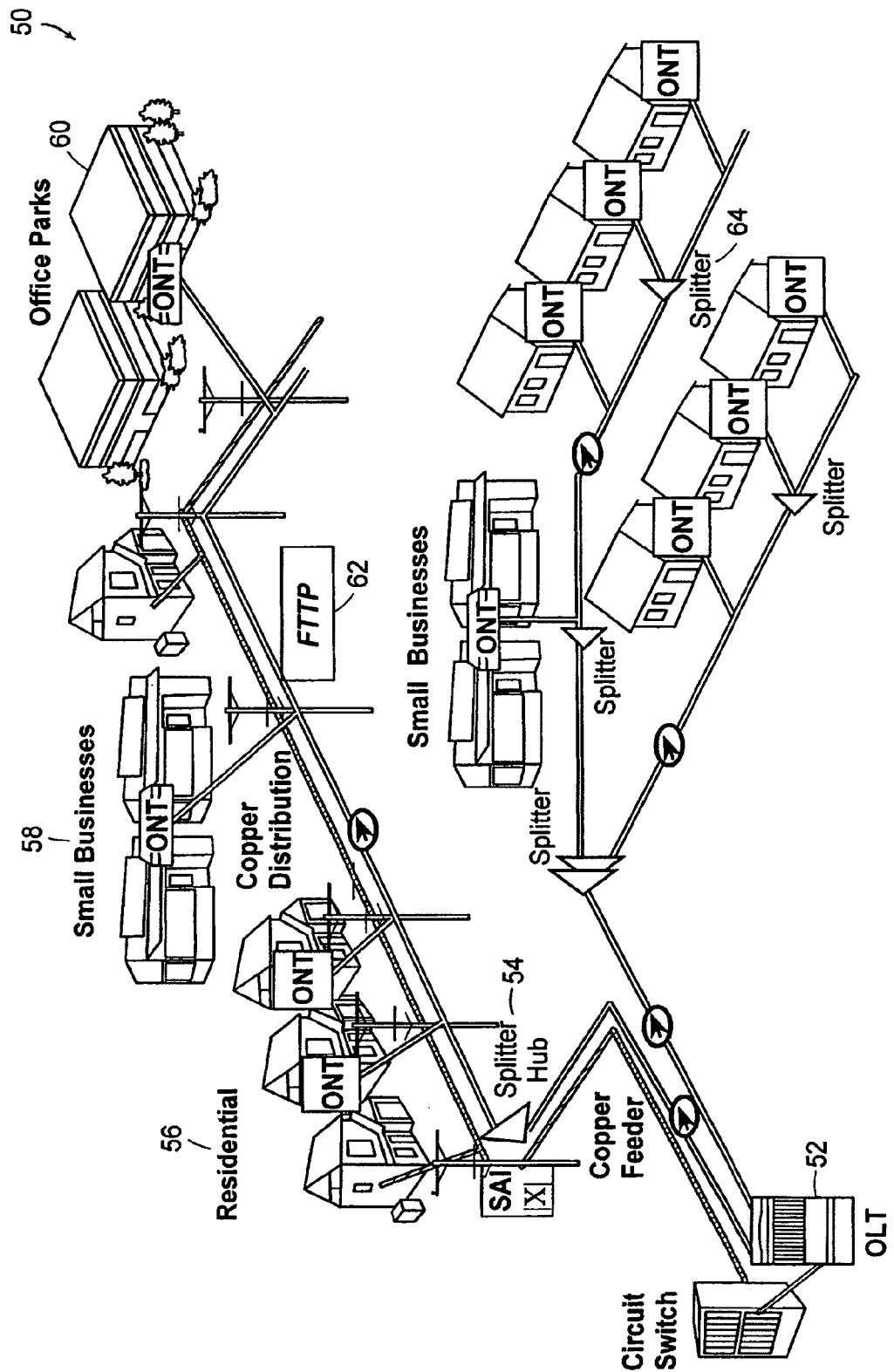
FIG. 2 illustrates schematically further details of an FTTP network in accordance with a preferred embodiment of the present invention.

FIG. 2 illustrates schematically further details of an FTTP network 50 in accordance with a preferred embodiment of the present invention. In Fiber-to-the-Premises broadband network applications optical splitters 64 are used to split the optical signals at various points in the network. In FTTP networks optical splitters are typically located in both indoor and outdoor environments including a Central Office/Head End, environmentally secure cabinets, enclosures or drop terminals. In some outdoor applications, optical splitters have been deployed in tightly sealed environmental closures that are not easily re-enterable. Preferred embodiments of the present invention provide optical splitter enclosures to effectively utilize splitter ports or to incrementally deploy additional splitters as the need arises. Preferred embodiments include optical splitters incorporated in Fiber Distribution Hubs 54 which are re-enterable outdoor enclosures. These enclosures allow easy re-entry for access to optical splitters allowing splitter ports to be utilized effectively and for additional splitter ports to be added on an incremental basis.

Preferred embodiments of the present invention include optical splitters that are provided prepackaged in optical splitter module housings that are mounted in a fiber patch panels to facilitate routing of jumpers interconnected from fibers in adjacent subscriber ports to the splitter outputs. This optical splitter cassette provides protective packaging and thus easy handling for otherwise fragile splitter components. The optical splitter modules can be added incrementally to the patch panel.

FTTP broadband networks are designed to achieve low optical insertion loss in order to achieve maximum network reach from electronics having fixed power output. Each optical component and subsystem utilized in the network is optimized to provide minimum insertion loss. The optical loss budget in a preferred embodiment is approximately 23 to 25 dB with 1:32 passive splitting. The components and factors contributing to the optical loss include splitters (1:32, single or cascaded), WDMs, connectors (optical line terminal (OLT), FDF, splitters, drop, ONT), fiber attenuation (at least three wavelengths: 1310 nm, 1490 nm, 1550 nm), and splicing.

The splitter hub 54 serves at least 128 splitter ports/premises. It includes multiple distribution cables, connectorized or fused between splitter and distribution. The preferred embodiments of the present invention provide efficient fiber connection and management with easy access, and low maintenance requirements. The splitter hubs of the preferred embodiments are pole or ground mountable. The drop terminals can be with or without splitters and include various number of drops, both aerial and buried.

In preferred embodiments, optical connectors are used in the network to provide the desired flexibility however they are restricted to those points in the network where flexibility is absolutely required. Optical connectors are required to provide flexible access to optical splitter outputs. The preferred embodiments of the present invention provide connector flexibility and yet minimize optical loss using the optical splitter module with connectorized pigtails. The pigtails have standard SC or LC type connectors on the ends.

Figure 3:
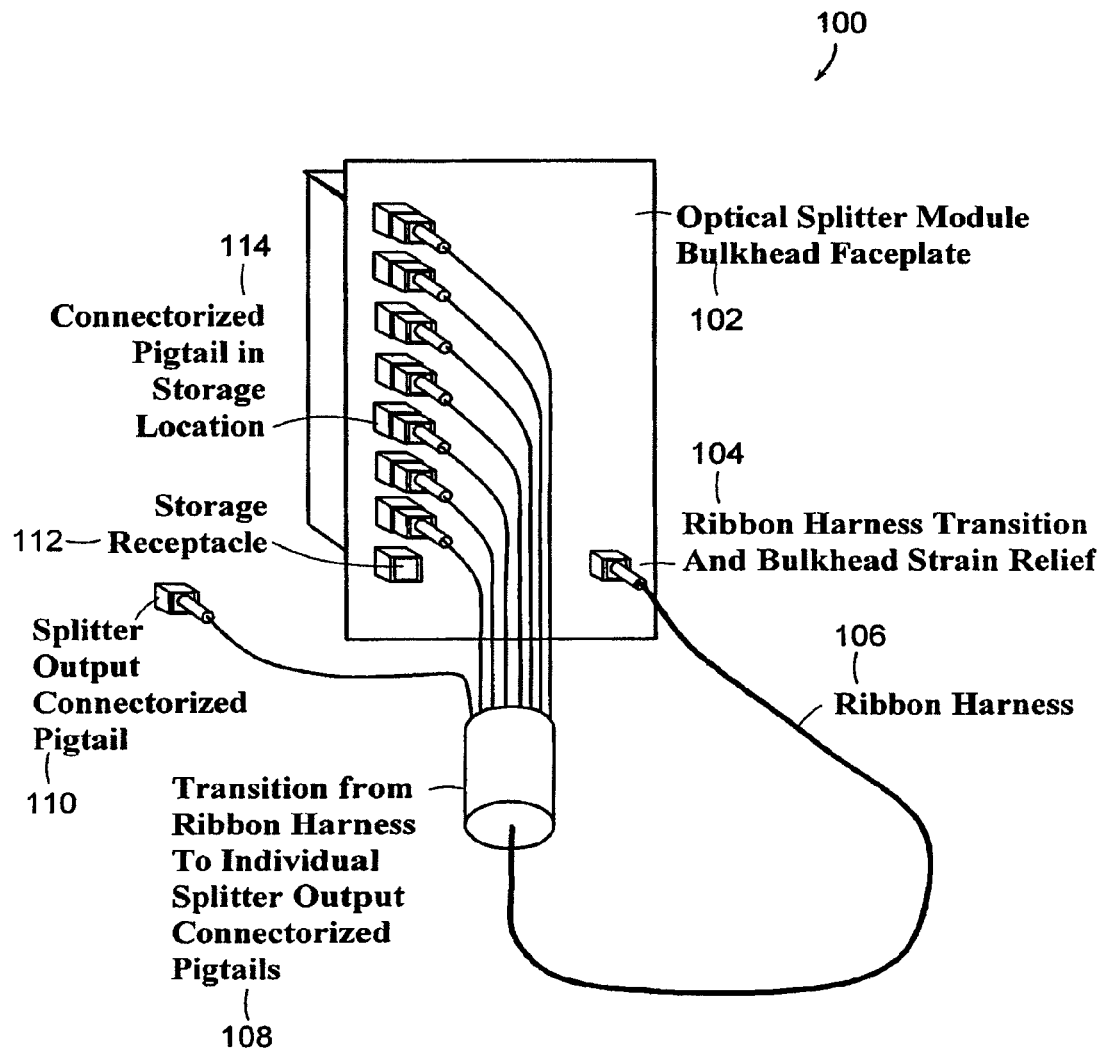
FIG. 3 illustrates an optical splitter module in a fiber distribution network having connectorized pigtails in accordance with a preferred embodiment of the present invention.

FIG. 3 illustrates an optical splitter module 100 in a fiber distribution network having connectorized pigtails in accordance with a preferred embodiment of the present invention. The module 100 includes a bulkhead faceplate 102 having storage receptacles 112. In a preferred embodiment, the optical splitter module 100 provides for a high density ribbon cabling harness 106 to protect the splitter outputs extending from the splitter module 100. The optical splitter module ribbon harness 106 is secured to the module 100 with a strain relief mechanism 104 to provide high pull strength and bend radius control. The compact nature of the ribbon harness 106 allows for higher packing density and better space utilization in the cabling trough. The module ribbon harness cabling 106 is converted at a transition member 108 to individual pigtails with connectors to allow splitter outputs to be administered and rearranged individually.

The module 100 may be equipped with either half nonfunctional adapters or full functioning adapters as a means for storing pigtail ends. In a preferred embodiment, the half nonfunctional adapters are used in applications not requiring fiber optic terminators but for storage functionality. The full functional adapters are used in applications requiring connection of fiber optic terminators to the optical splitter output port. Access to the pigtail ferrule tip may be required for attaching fiber optic terminators to eliminate undesirable reflections caused by unterminated connectors. The module 100 provides a home position from which optical splitter output pigtails can be deployed and where they can be returned to once taken out of service. This administrative use of adapters provides protection for the connectorized pigtails ends 110, maintains cleanliness of the connector ends, and enables rapid service connection and deployment.

The preferred embodiments of the present invention address configuring a fiber distribution hub with optical splitter modules having fixed length connectorized pigtails. One aspect of the preferred embodiment determines where to position the optical splitter modules relative to other fiber terminations needing access to the optical splitter ports. The preferred embodiments also addresses installing the pigtails in a configuration that requires minimal pigtail rearrangement and slack yet allowing for enough slack to reach any of the fiber terminations requiring access to splitter ports. The methods of installing optical splitter module pigtails include determining how to route the pigtails in order to provide an optimal routing scheme that does not get congested and wherein slack can be controlled within set limits of the enclosure. The methods in accordance with a preferred embodiment of the present invention include making all pigtails the same length for ease of manufacturing and ordering by the customer. Splitter modules all having the same pigtail length also allow ease of flexibility for allowing a splitter module to be installed in any available slot within the patch panel without regard to sequential order.

A preferred embodiment of the method for installing the splitter module pigtails also provides for fiber management in the enclosure so that rearrangement and churn does not congest this management. To accomplish this, the slack and any chance of blocking access because of fiber entanglement is minimized. The preferred embodiments allow for churn over time including initial pigtail storage, service connection, service disconnection and repeat storage to provide ready access to pigtails for future use. The methods of the present invention are non-blocking and non-congesting for jumpers routed into cable pathways and fiber patch panels. The method of a preferred embodiment is fully contained within the confines of the enclosure.

Figure 4A:
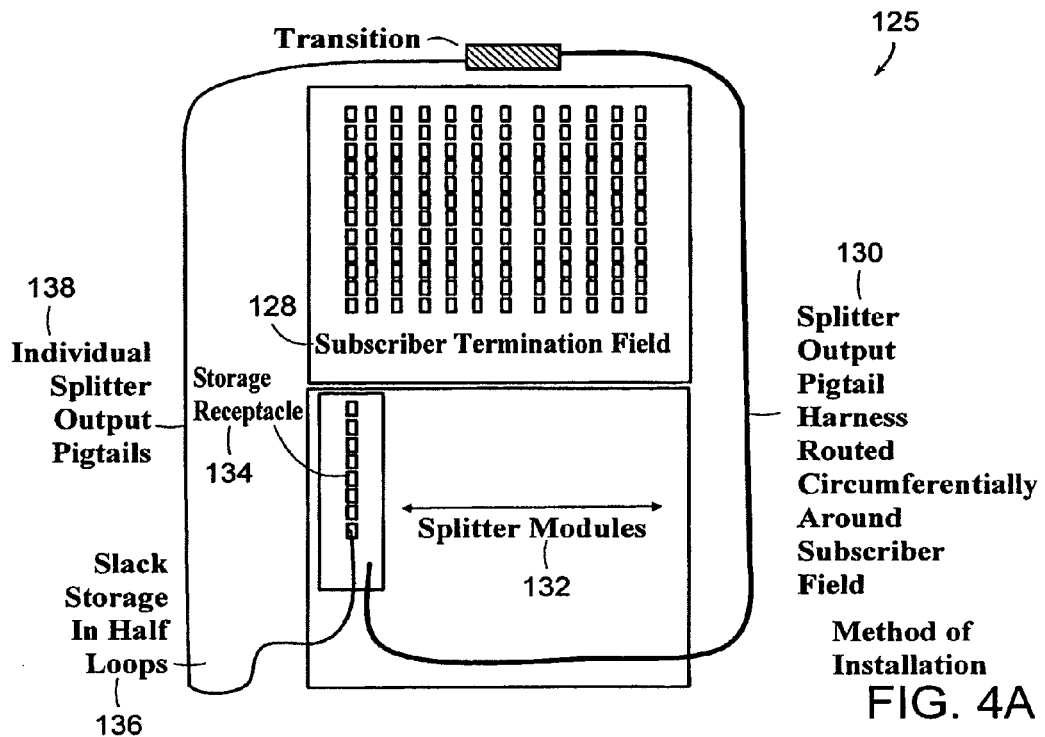
FIG. 4A schematically illustrates the installation of the optical splitter module pigtails in accordance with a preferred embodiment of the present invention.

FIG. 4A schematically illustrates the installation of the optical splitter module pigtails in accordance with a preferred embodiment of the present invention. A preferred embodiment of the present invention includes a cabling installation method 125 including splitter modules incrementally installed on a shelf adjacent to a subscriber termination field 128. The connectorized pigtails 138 from the splitter modules 132 having fixed identical length are routed in a circumferential path 130 surrounding the subscriber termination field 128. In FIG. 4A, the connectorized pigtails 138 are routed up a first side of the termination field 128, across a top of the termination field 128, down a second side of the termination field 128, through half loop slack storage 136, to the splitter module 132. The connectorized ends of the pigtails are stored at a position on the front of the splitter module 132 via storage receptacle 134. The method in accordance with a preferred embodiment employs a fan through placement so that the splitter module pigtails can be installed without disturbing installation of pigtails already connected to subscriber terminations. This installation method in accordance with a preferred method of the present invention also ensures that the splitter module 132 can be preconfigured with the pigtail connectors in the storage position and left in the storage position throughout the pigtail installation process.

Figure 4B:
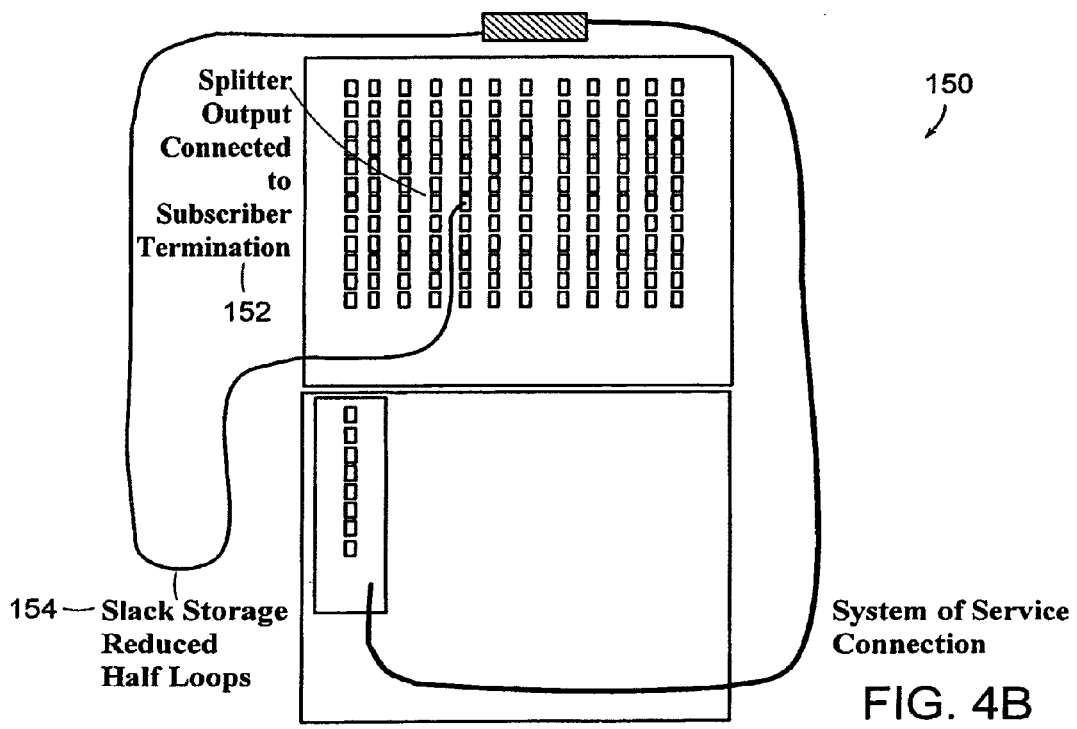
FIG. 4B schematically illustrates the service connection configuration of the optical splitter module in accordance with a preferred embodiment of the present invention.

FIG. 4B schematically illustrates a service connection configuration 150 of the optical splitter module in accordance with the preferred embodiment of the present invention shown in FIG. 4A. The preferred embodiments of the present invention include a service connection method to connect a subscriber into service by first disconnecting an individual splitter output pigtail from the storage position and then routing the pigtail to the desired subscriber port 152. In FIG. 4B, the pigtail is routed from the half loop storage 154 to the termination field 128. Since the pigtail harness has been preconfigured and routed circumferentially around the subscriber termination field, the pigtail inherently reaches any of the desired subscriber ports within the target population by simply reducing the circumferential path distance. By reducing the circumferential path the pigtail slack exhibits additional slack. The additional slack may be taken up using slack-half loops 154 in the vertical channel where the pigtails are routed. The random nature of connecting splitter output pigtails to subscriber ports may result in a family of various size half-loops 154 that are managed in the vertical channel within the confines of the cabinet.

Figure 5A:
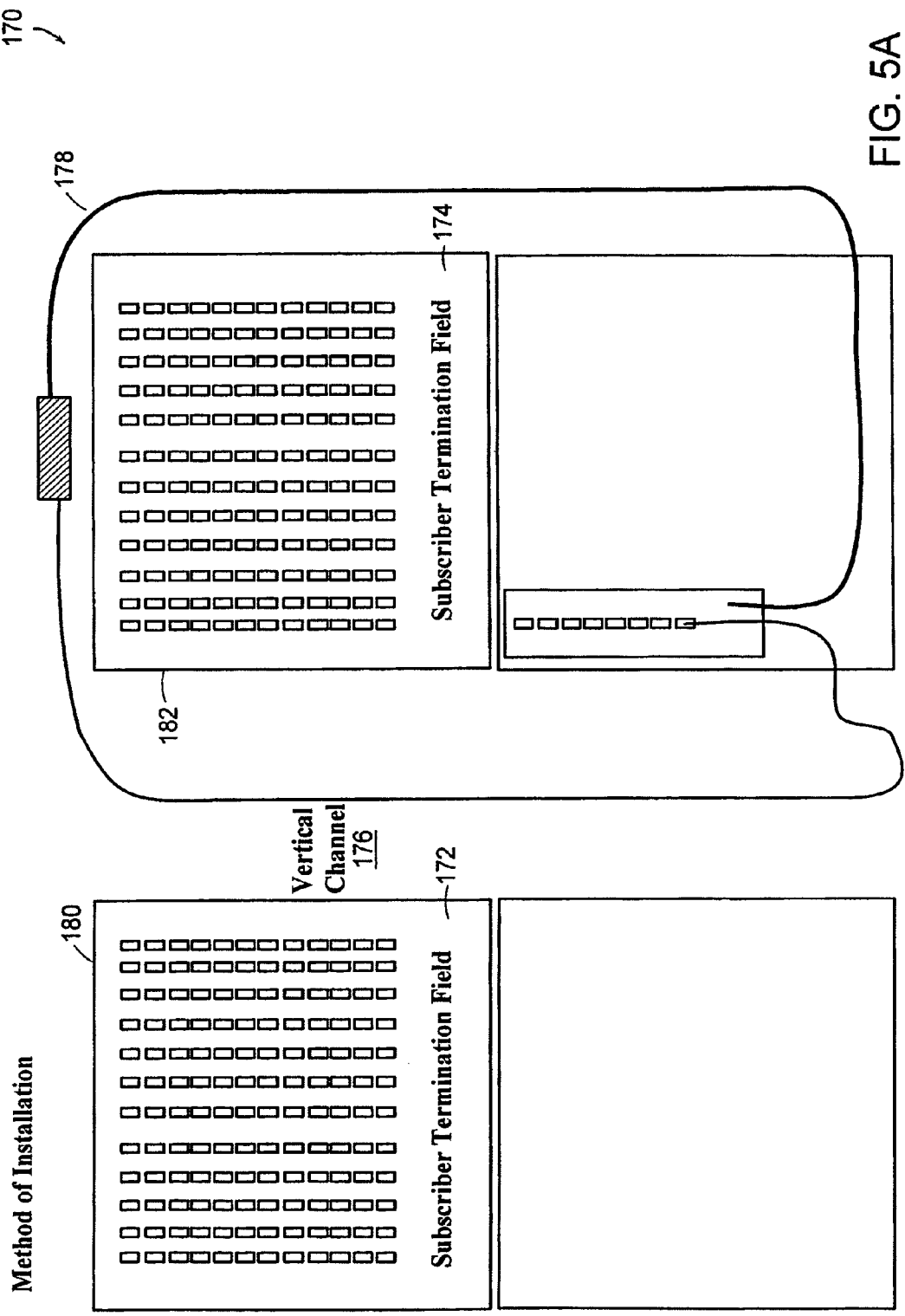
FIGS. 5A and 5B schematically illustrate the installation of the optical splitter module pigtails and the service connection configuration of the optical splitter module, respectively, in a network having modules adjacent to each other in accordance with a preferred embodiment of the present invention.
Figure 5B:
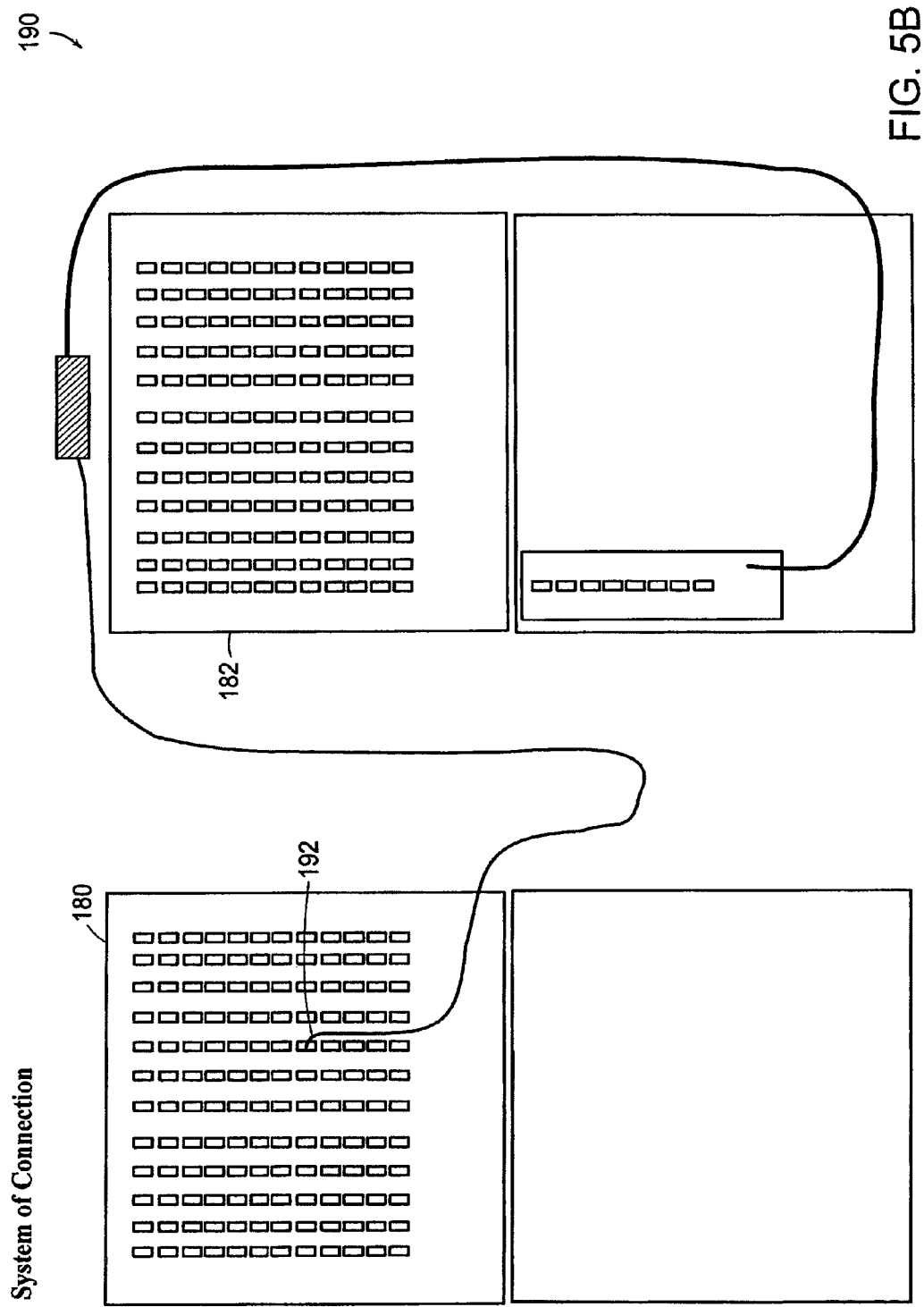

FIGS. 5A and 5B schematically illustrate the installation of the optical splitter module pigtails and the service connection configuration of the optical splitter module, respectively, in a network having modules adjacent to each other in accordance with a preferred embodiment of the present invention. A preferred embodiment of the present invention includes a method to connect subscriber ports that are in an adjacent field but not initially contained within the circumference of the splitter pigtail harness. In this extension the splitter output pigtail is routed to the adjacent field which by virtue of a juxtaposed position has a path at the same distance to the subscriber port within the circumference. The subscriber ports in the adjacent field also are assigned randomly therefore the resultant slack is managed using a family of various size half-loops in the vertical channel 176.

Figure 5C:
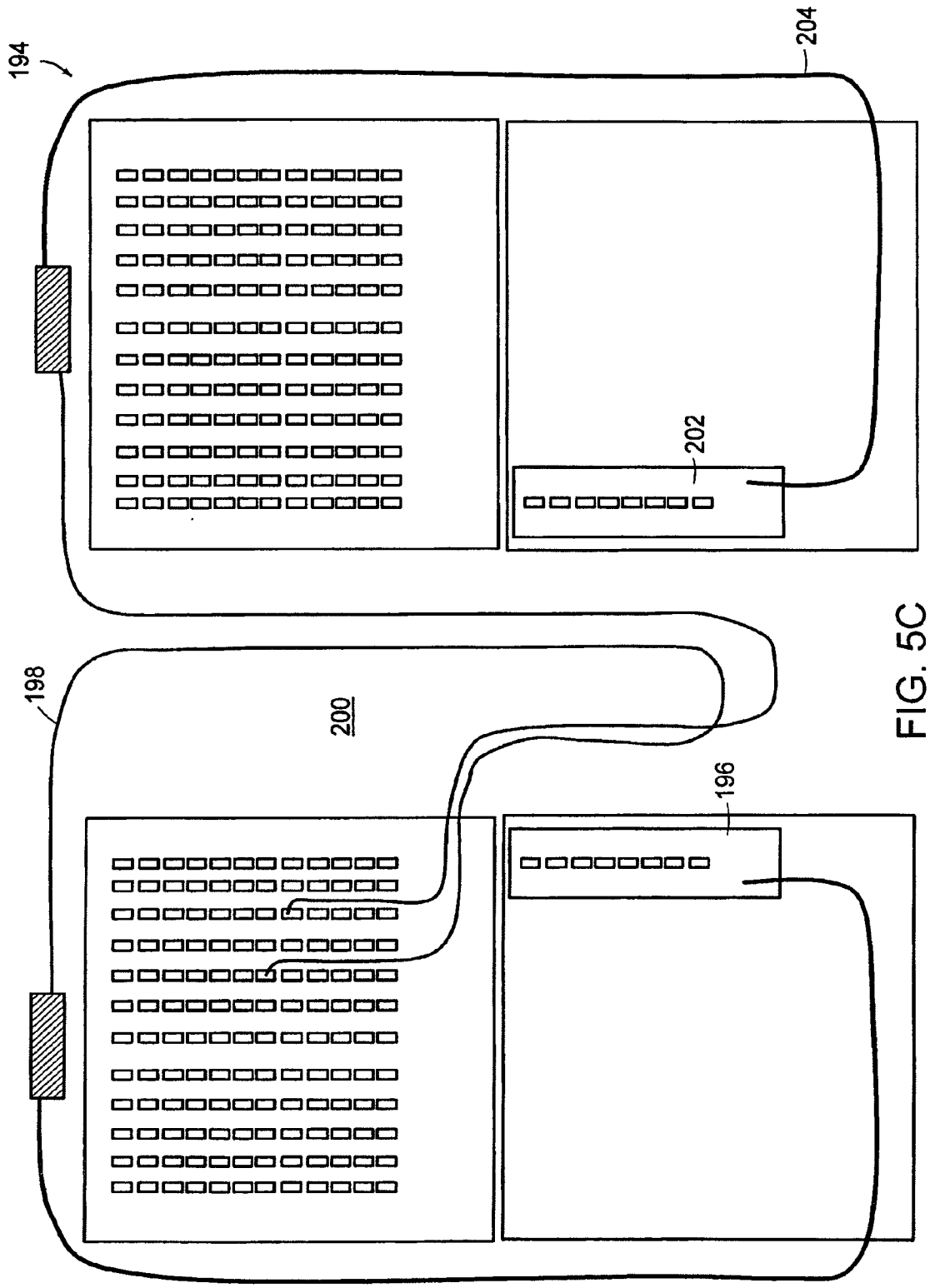
FIGS. 5C and 5D schematically illustrate the service connection configurations between adjacent fiber distribution hubs in accordance with alternate preferred embodiments of the present invention.
Figure 5D:
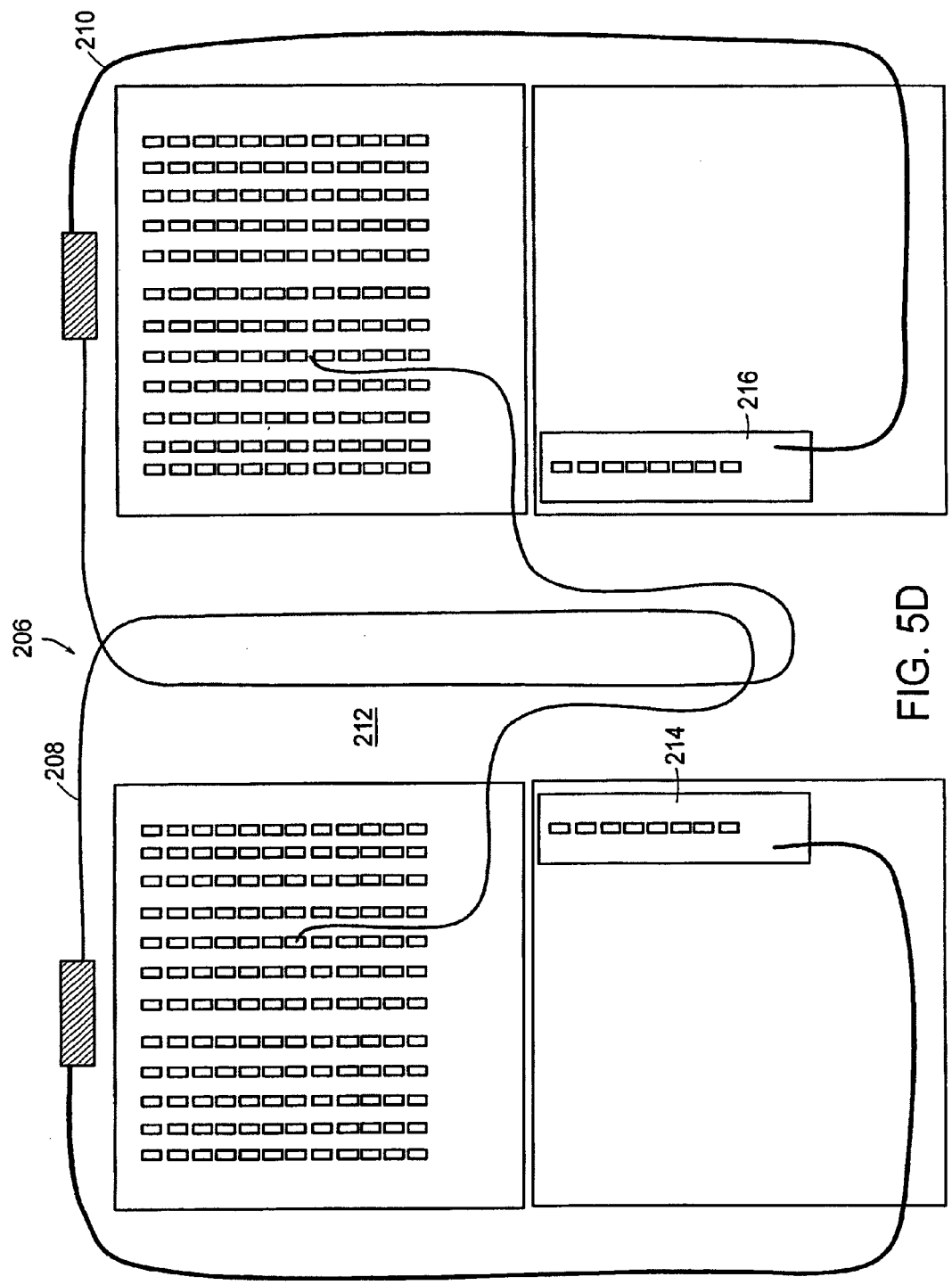

FIGS. 5C and 5D schematically illustrate the service connection configurations 194, 206 of the termination and splitter fields in adjacent fiber distribution hubs in accordance with a preferred embodiment of the present invention. The pigtails 198, 208 of the left module 196, 214 are routed circumferentially clockwise while the right pigtails 204, 210 of the module 202, 216 are routed circumferentially counterclockwise in a preferred embodiment. The fiber distribution hubs in this embodiment are located adjacent to one another, each having a splitter shelf with splitter modules and a termination shelf. The counter rotating feed provide for routing of the splitter module output pigtails circumferentially around the subscriber termination fields. The pigtail slack is stored in the vertical channels 200, 212.

A preferred embodiment includes a method of removing a splitter pigtail from a subscriber port and either redeploying that output pigtail to a new subscriber or storing the pigtail back to the original storage position at the splitter module. The method is completely non-blocking and non-congesting due to the planned slack management.

Figure 6:
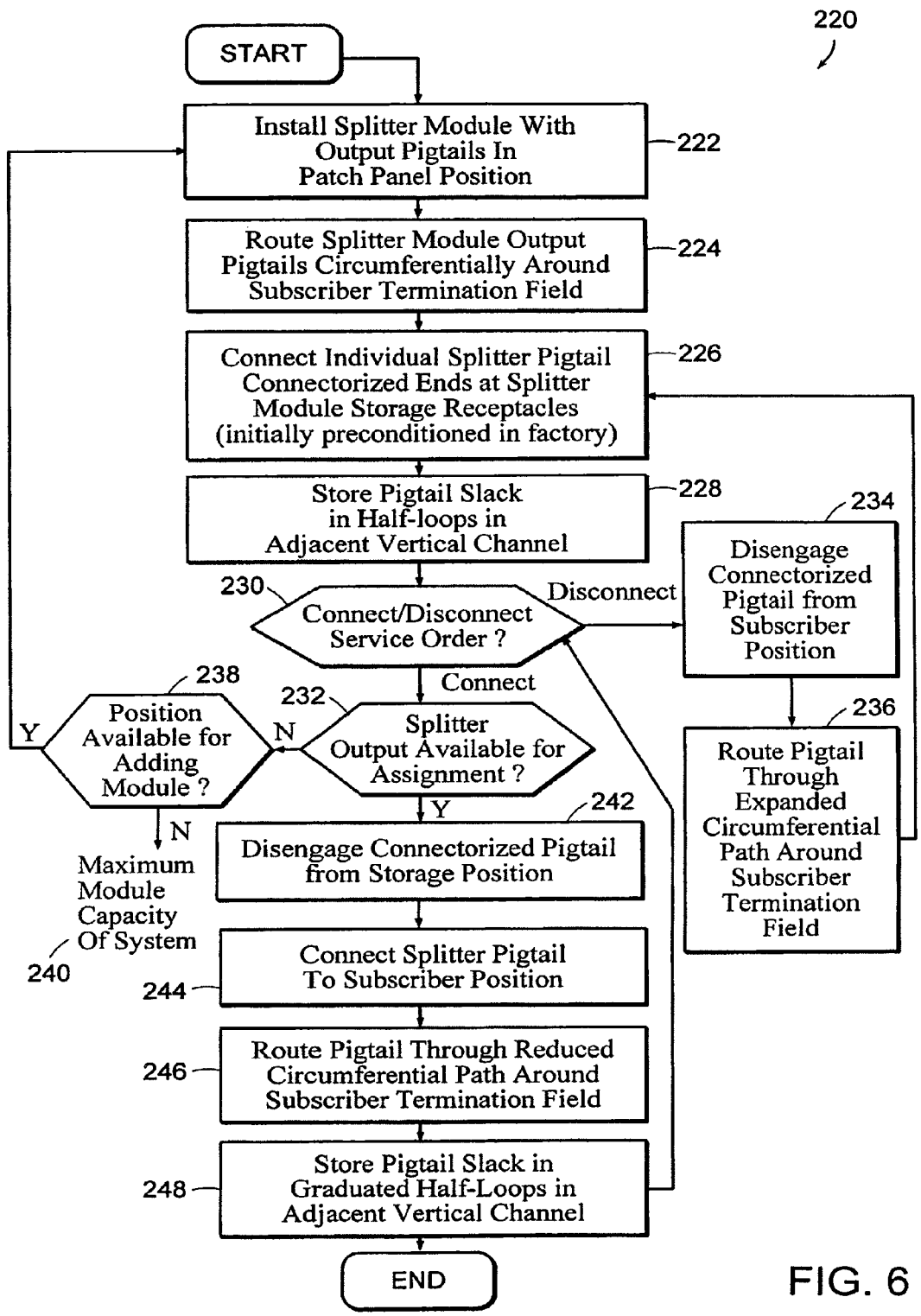
FIG. 6 is a flow chart illustrating a method for installing and connecting optical splitter module pigtails in accordance with a preferred embodiment of the present invention.

FIG. 6 is a flow chart illustrating a method for installing and connecting optical splitter module pigtails in accordance with a preferred embodiment of the present invention. The method includes the step 222 of installing a splitter module with output pigtails in a patch panel position. Further, the method includes the step 224 of routing the splitter module output pigtails circumferentially around a subscriber termination field. The method includes the step 226 of connecting an individual splitter pigtail connectorized ends at splitter module storage receptacles. These storage receptacles can be initially preconditioned in the factory. The method includes a next step 228 of storing the pigtail slack in half-loops in an adjacent vertical channel. Further, the method includes the step 230 of deciding whether to connect or disconnect the service order. If a service order needs to be connected, the method includes the decision in step 232 of determining if a splitter output is available for assignment. If it is determined that the splitter output is available for assignment then the method progresses to step 242 of disengaging connectorized pigtail from the storage position. If it is determined that the splitter output is not available per step 238 then it is determined if a position is available for adding a module. If yes, then the method steps are reiterated starting back from step 222. If, however, it is determined that there is no position available then the maximum module capacity of the system has been reached.

The method also includes the option of disconnecting the service order per step 234. The step 234 includes disengaging the connectorized pigtail from the subscriber position and per step 236 routing the pigtail through an expanded circumferential path around the subscriber termination field 236.

The method further includes the step 244 of connecting the splitter pigtail to the subscriber position and the step 246 of routing the pigtail through a reduced circumferential path around the subscriber termination field. The method includes the step 248 of storing the pigtail slack in graduated half-loops in an adjacent vertical channel.

FIGS. 7A-7E illustrate views of a fiber distribution hub in accordance with a preferred embodiment of the present invention. The fiber distribution hub (FDH) in accordance with a preferred embodiment administers connections between fiber optic cables and passive optical splitters in the outside plant (OSP) environment. These enclosures are used to connect feeder and distribution cables via power splitters providing distributed service in a FTTP network application. The preferred embodiment FDH provides a vital cross-connect/interconnect interface for optical transmission signals at a location in the network where fiber hubbing, operational access and reconfiguration are important requirements. In addition the FDH is designed to accommodate a range of sizes and fiber counts and support factory installation of pigtails, fanouts and splitters.

Figure 7A:
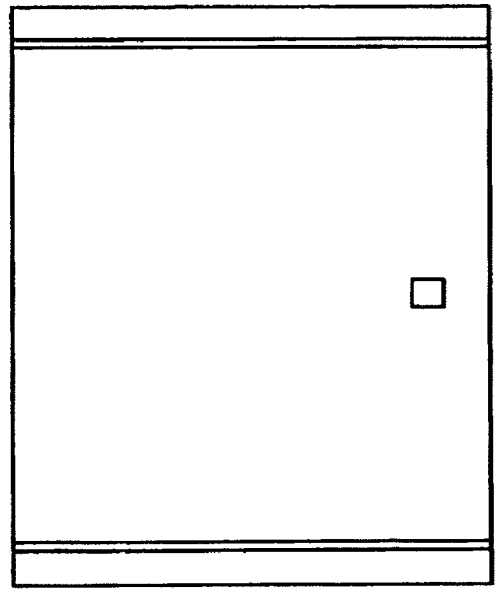
FIGS. 7A-7E illustrate views of the fiber distribution hub in accordance with preferred embodiments of the present invention.
Figure 7B:
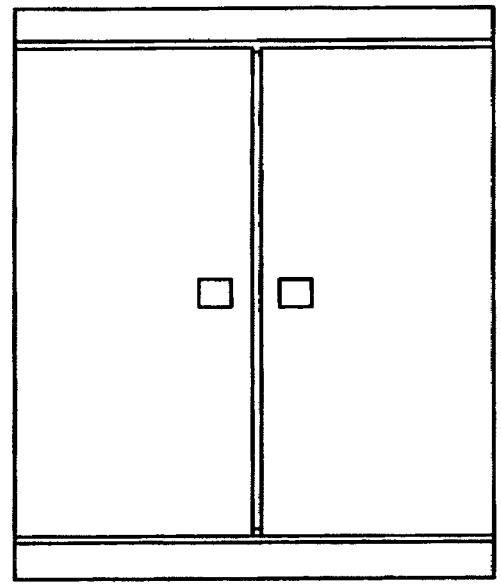
Figure 7C:
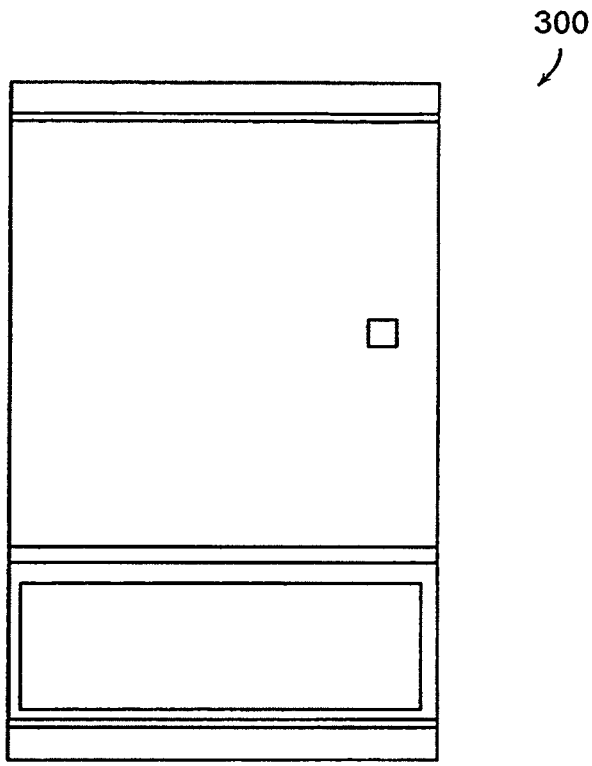
Figure 7D:
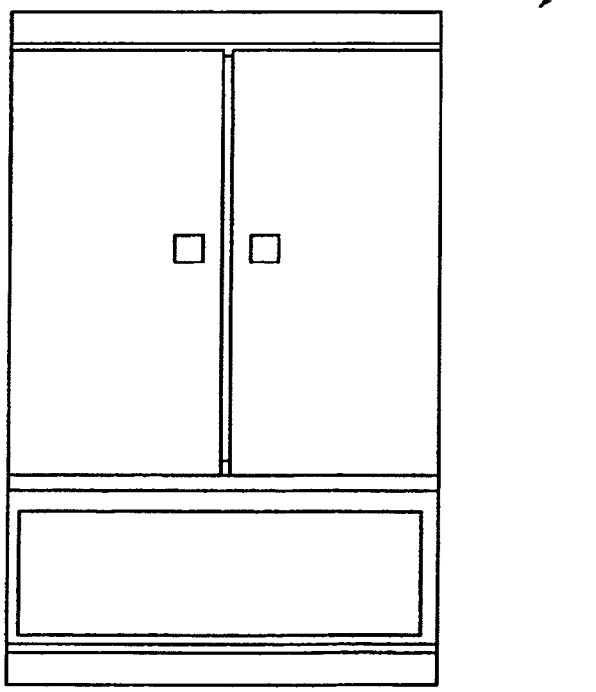
Figure 7E:
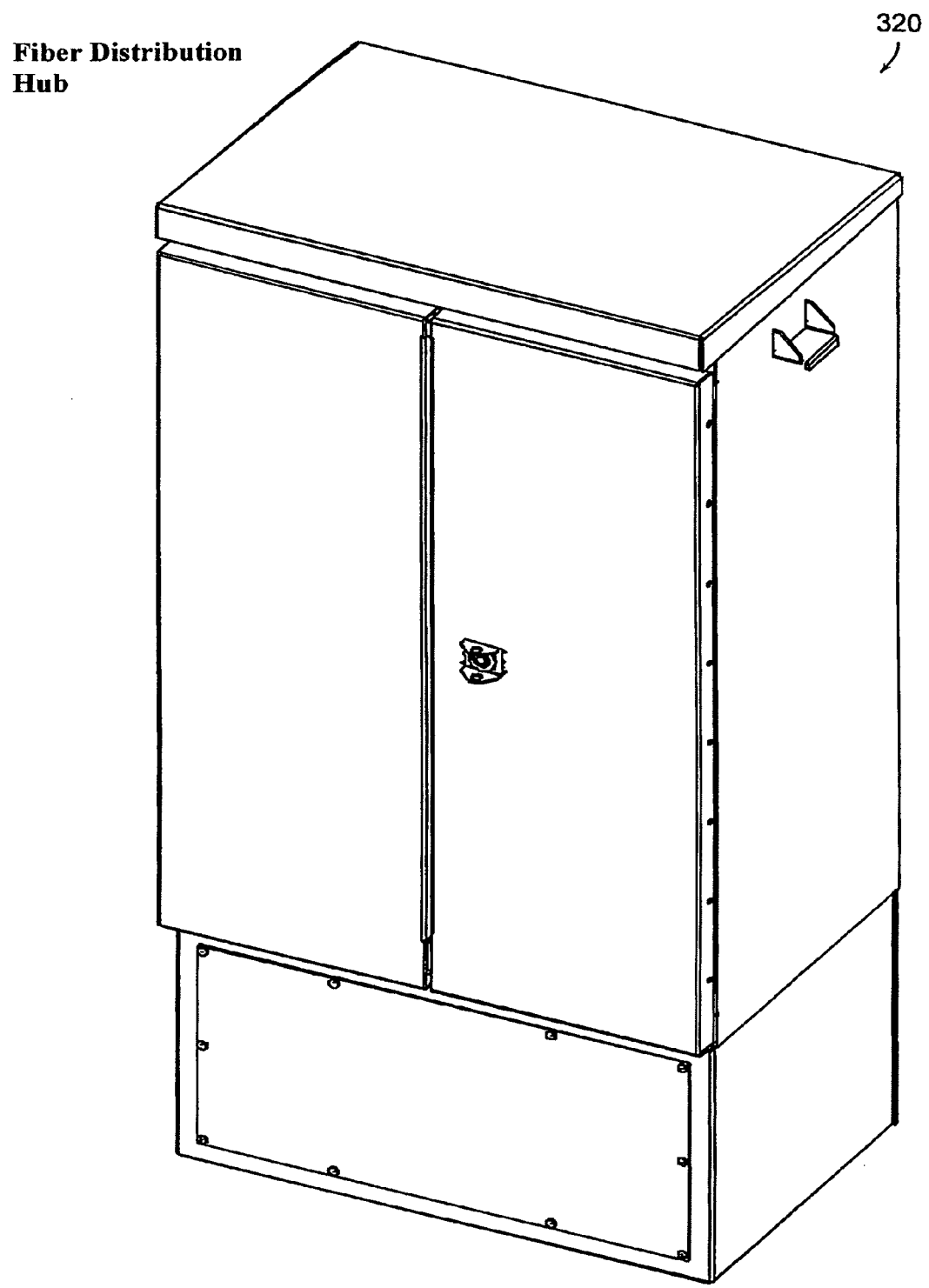

In a preferred embodiment, the FDH enclosure is designed for front access via a two-door configuration (FIG. 7E). The FDH provides termination, splicing, interconnection and splitting in one compartment. The unit accommodates either metallic or dielectric OSP cables via sealed grommet entry. Cables are secured with standard grip clamps. The FDH provides grounding for metallic members and for the cabinet.

The enclosure provides environmental and mechanical protection for cables, splices, connectors and passive optical splitters. These heavy gauge aluminum enclosures are NEMA-4X rated and provide the necessary protection against rain, wind, dust, rodents and other environmental contaminants. At the same time, they remain lightweight for easy installation, and breathable to prevent accumulation of moisture in the unit. The aluminum construction with a heavy power coat finish also provides for corrosion resistance. The enclosure is accessible through secure doors that are locked with standard tool or pad-lock.

In accordance with preferred embodiments, the FDH is provided in pole mount or pedestal mount configurations. The same cabinet and working space is available in both pole mount (FIGS. 7A and 7B) and pedestal mount units (FIGS. 7C, 7D and 7E). Three sizes of the fiber distribution hubs are available, for example, to correspond to three different feeder counts, for example, 144, 216 and 432.

Figure 8:
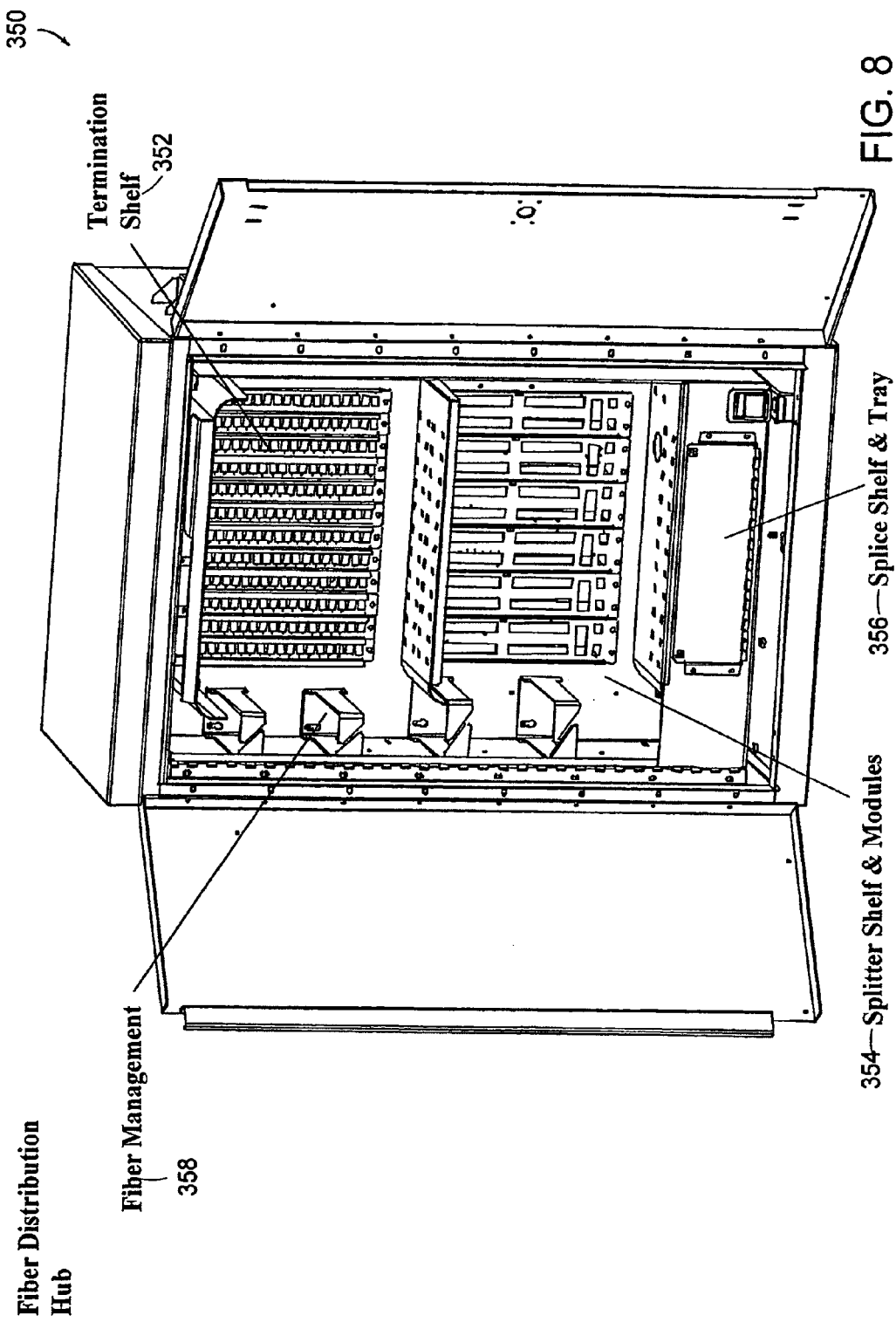
FIG. 8 illustrates a view of the internal components of a fiber distribution hub enclosure in accordance with a preferred embodiment of the present invention.

FIG. 8 illustrates a view of the internal components of a fiber distribution hub enclosure 350 in accordance with a preferred embodiment of the present invention. The FDH enclosure 350 can be configured in a number of different ways to support fiber cable termination and interconnection to passive optical splitters. The configuration illustrated in the preferred embodiment provides for a termination shelf 352, a splitter shelf and optical component modules 354 and a channel for fiber management 358. The illustrated configuration also includes a splice shelf and tray 356 arranged beneath the termination shelf 352.

The termination shelf 352 can be based on the standard main distribution center (MDC) enclosure line that provides complete management for fiber terminations in accordance with a preferred embodiment of the present invention. In a preferred embodiment, the termination shelf is preterminated in the factory with a stub cable containing either 144-fibers, 216-fibers or 432-fibers. This stub cable is used to connect services to distribution cables routed to residences. The distribution fibers are terminated on certified connectors. The termination shelf uses standard 12-pack or 18-pack adapter panels, for example, that have been ergonomically designed to provide easy access to fiber terminations in the field. The panels can be mounted on a hinged bulkhead to allow easy access to the rear for maintenance. The fiber jumpers are organized and protected as they transition into the fiber management section 358 of the enclosure.

The splitter shelf 354 can be based on a standard fiber patch panel that accepts standard optical component modules (OCM) holding optical splitters in accordance with a preferred embodiment of the present invention. In a preferred embodiment, the splitter cassettes are designed to simply snap into the shelf and therefore can be added incrementally as needed. The splitter shelf serves to protect and organize the input and output fibers connected to the cassettes. Splitter shelves are available in various sizes and the shelf size can be optimized for different OCM module configurations.

Figure 9:
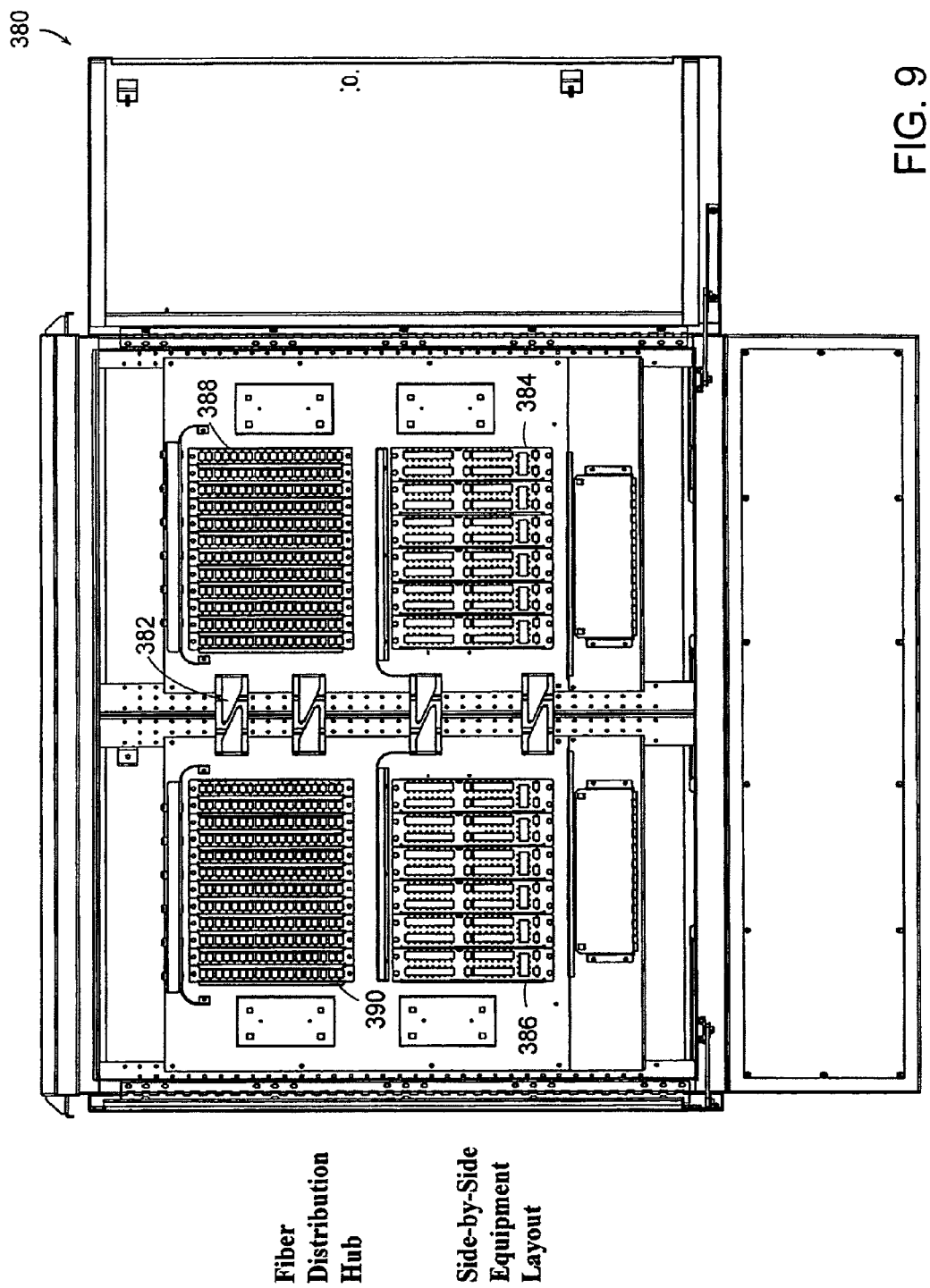
FIG. 9 illustrates a schematic view of a fiber distribution hub enclosure having a side-by-side equipment configuration in accordance with a preferred embodiment of the present invention.

FIG. 9 illustrates a schematic view of a fiber distribution hub enclosure 380 having a side-by-side equipment configuration in accordance with a preferred embodiment of the present invention. There are two adjacent termination shelves 388, 390 and two adjacent splitter shelves 384, 386, separated by a central fiber management channel 382 in accordance with a preferred embodiment of the present invention.

Figure 10:
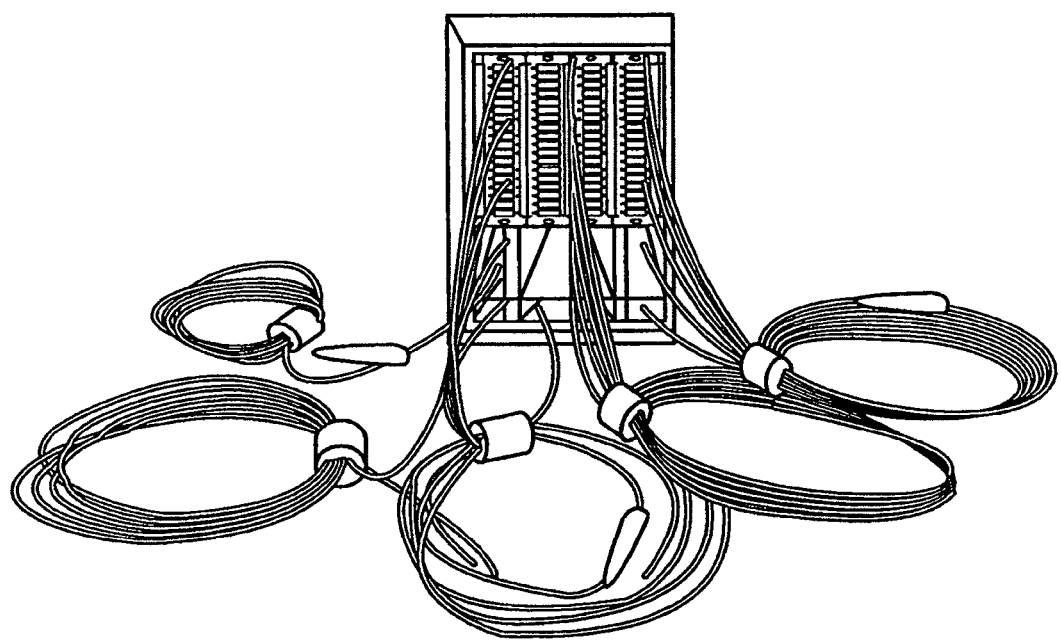
FIG. 10 illustrates a view of the optical component modules used in a fiber distribution hub enclosure in accordance with a preferred embodiment of the present invention.

FIG. 10 illustrates a view of the optical component modules in a fiber distribution hub enclosure in accordance with a preferred embodiment of the present invention. The FDH configuration in a preferred embodiment provides for fiber management hardware on one side of the cabinet. This allows fiber jumpers to be routed between the termination shelf and the splitter shelf. Excess slack can be managed on the side of the cabinet using slack loops.

In accordance with a preferred embodiment, OCM modules can also be equipped with pigtails to reduce the number of connections in the network. The module shown in FIG. 10 contains a 1×32 splitter with pigtails provided on the input and 32 outputs. The connectorized ends of the pigtails are stored on bulkhead adapters on the front of the module. These storage adapters provide a familiar locating scheme for spare pigtails so that connector ends can be quickly identified and connected to distribution fibers. The spacing on the adapters is the same as on standard connector panels.

In preferred embodiments, OCM modules can also be equipped with standard terminators. Modules terminated with bulkhead adapters may be equipped with terminators on the front of the module. Modules connected via pigtails and equipped with storage adapters are equipped with terminators on the rear of the panel.

The claims should not be read as limited to the described order or elements unless stated to that effect. Therefore, all embodiments that come within the scope and spirit of the following claims and equivalents thereto are claimed as the invention.

What is claimed is:

1. A method for adding equipment to a fiber distribution hub, the equipment including a splitter module having output pigtails with ends connectorized by pigtail connectors, the pigtail connectors of the output pigtails being stored within storage receptacles, the fiber distribution hub including a subscriber termination field, the method comprising:
installing the splitter module, the storage receptacles and the pigtails within the fiber distribution hub with the pigtail connectors left in the storage receptacles while the splitter module, the storage receptacles, and the pigtails are being installed within the fiber distribution hub.

2. The method of claim 1, wherein the pigtails are routed circumferentially about the subscriber termination field while the splitter module, the storage receptacles, and the pigtails are being installed within the fiber distribution hub.

3. The method of claim 1, wherein the storage receptacles only provide a storage function.

4. The method of claim 1, wherein the storage receptacles are provided on the splitter module.

5. The method of claim 1, further comprising providing a service connection by disconnecting an individual one of the pigtails from its corresponding storage receptacle, routing the pigtail to the subscriber termination field and connecting the pigtail to the subscriber termination field.

* * * * *